United States Patent [19]

Gore et al.

[11] Patent Number: 4,545,862

[45] Date of Patent: Oct. 8, 1985

[54] DESALINATION DEVICE AND PROCESS

[75] Inventors: Wilbert L. Gore; Robert W. Gore, both of Newark, Del.; David W. Gore, Flagstaff, Ariz.

[73] Assignee: W. L. Gore & Associates, Inc., Del.

[21] Appl. No.: 354,140

[22] Filed: Mar. 5, 1982

Related U.S. Application Data

[63] Continuation-in-part of Ser. No. 244,724, Mar. 17, 1981, abandoned, which is a continuation-in-part of Ser. No. 143,724, Apr. 25, 1980, abandoned.

[51] Int. Cl.$^4$ .......................... B01D 3/00; C02F 1/04
[52] U.S. Cl. ......................................... 203/10; 203/22; 203/25; 203/86; 203/DIG. 22; 159/DIG. 27; 202/172; 202/173; 202/175; 202/180; 202/202; 202/265; 202/266; 210/321.5; 210/640
[58] Field of Search ....................... 203/10, 11, 21–27, 203/86, 99, 100, DIG. 22, DIG. 16, DIG. 1, DIG. 17; 202/180, 202, 266, 270, 172, 173, 175, 265; 159/DIG. 27; 210/321.5, 486, 346, 640; 55/11, 16, 158

[56] References Cited

U.S. PATENT DOCUMENTS

| | | | |
|---|---|---|---|
| 3,340,186 | 9/1967 | Weyl | 203/10 X |
| 3,361,645 | 1/1968 | Bodell | 159/DIG. 27 X |
| 3,454,470 | 7/1969 | Guarino | 159/DIG. 27 X |
| 3,455,792 | 7/1969 | Ohta | 159/DIG. 27 X |
| 3,540,986 | 11/1970 | Guarino | 159/DIG. 27 X |
| 3,549,503 | 12/1970 | Hay | 202/234 X |
| 3,563,860 | 2/1971 | Henderyckx | 202/180 X |
| 3,661,721 | 5/1972 | Rodgers | 159/DIG. 27 X |
| 3,765,981 | 10/1973 | Rodgers | 203/10 X |
| 3,785,931 | 1/1974 | Coffey et al. | 203/DIG. 1 |
| 3,841,976 | 10/1974 | Scott et al. | 159/DIG. 27 |
| 3,925,167 | 12/1975 | Rodgers | 159/DIG. 27 |
| 4,265,713 | 5/1981 | Cheng | 159/DIG. 27 |
| 4,269,663 | 5/1981 | McFee | 202/202 |
| 4,405,460 | 9/1983 | Disselbeck et al. | 210/640 |

FOREIGN PATENT DOCUMENTS

| | | |
|---|---|---|
| 0039197A | 11/1981 | European Pat. Off. . |
| 3005192 | 8/1980 | Fed. Rep. of Germany . |
| WO80/00077 | 1/1980 | PCT Int'l Appl. . |
| 1225254 | 3/1971 | United Kingdom . |
| 1541283 | 2/1979 | United Kingdom . |
| 2043474 | 10/1980 | United Kingdom . |

*Primary Examiner*—Wilbur Bascomb
*Attorney, Agent, or Firm*—Finnegan, Henderson, Farabow, Garrett & Dunner

[57] ABSTRACT

A membrane distillation module is provided with a thin, flexible microporous membrane positioned against an impermeable condensor sheet that is stiffer in bending than the membrane. Distillate vapor diffuses through the membrane from the hot feed flowing rapidly past the membrane, and condenses and collects between, and in intimate contact with, the membrane and the condensor sheet. The condensed distillate is stripped by forces exerted by the hot feed acting on the distillate across the membrane, and flows toward a distillate outlet located in the downstream direction of the hot feed flow. Cold feed flows past the condensor sheet in the counter direction to that of the hot feed for absorbing the latent heat of condensation, and is subsequently additionally heated and introduced into the hot feed channel. Expanded microporous polytetrafluoroethylene (PTFE) is the preferred membrane material, and a spiral-wound assembly is the preferred configuration.

24 Claims, 5 Drawing Figures

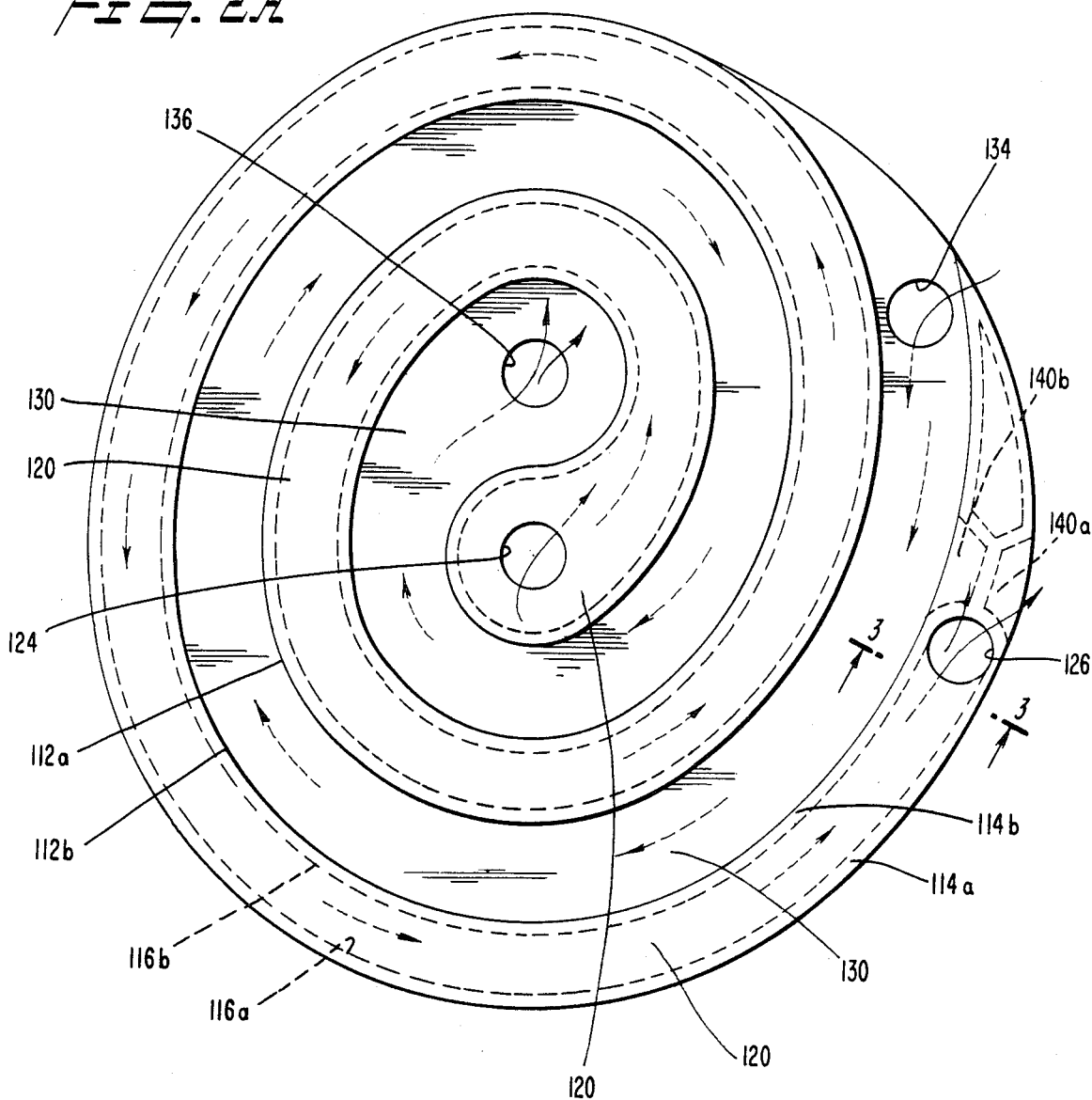
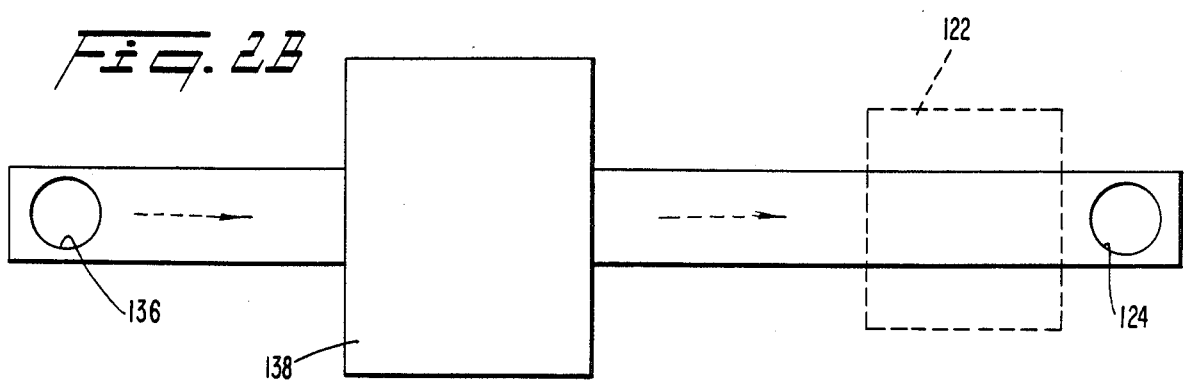

DESALINATION DEVICE AND PROCESS

This application is a continuation-in-part of application Ser. No. 244,724 filed Mar. 17, 1981 and now abandoned which was a continuation-in-part of application Ser. No. 143,724 filed Apr. 25, 1980, now abandoned.

BACKGROUND OF THE INVENTION

1. Field of the Invention

This invention relates to an improved process and apparatus for the distillation of aqueous liquids and is particularly useful in the distillation of sea water to produce fresh water.

2. Description of the Prior Art

Distillation is a process for vaporizing a liquid and then condensing the vapor. It is useful in separating volatile portions of a mixture from non-volatile or less volatile components.

A practical distillation device must effect this separation at a low cost in both energy and in capital. Only when both of these cost elements are low is a distillation device or process likely to be useful. Energy efficiency is commonly measured as a "performance ratio", which is the amount of latent heat recovered divided by the amount of heat applied to the system. A high performance ratio in a device implies low energy cost. Typical performance ratios for commercial distillation plants are in the range of six to twelve. Capital cost depends on the cost of component materials, the amount of material needed, and the complexity of the system. Currently available distillation systems are expensive, because they require exotic alloys and are mechanically complex.

Attempts have been made to construct distillation apparatus using porous materials through which the liquid vapor can diffuse, and U.S. Pat. No. 3,340,186 to Weyl is an example of previous efforts using microporous, hydrophobic PTFE membrane. For such "membrane distillation" apparatus, capital cost can be related to the amount of distillate produced per unit area of membrane per unit time. In what follows, this will be referred to as the "productivity" of the device or process. The more productive a device, the lower its capital cost is likely to be per unit of distillate produced.

It is difficult to devise a distillation process which is both energy efficient and productive. In any such process, increasing the productivity by increasing the temperature difference between the warm evaporating salt water and the cooler salt water in the condensor will result in a decreased performance ratio. The objective, therefore, is to decrease this temperature difference while maintaining the same productivity. This may be achieved by decreasing the "vapor gap distance", that is, the distance which the vapor must travel from the point of evaporation to the point of condensation; decreasing the thickness of the distillate layer; improving the mixing of the salt water within the channels; and/or using a more thermally conductive material for the condensor.

Attempts have also been made to construct "sandwich" or multi-effect devices as a means of recovering the latent heat of the condensate, but to a large extent these attempts have not resulted in a practical distillation device. Mixing within the salt water channels can be poor, because attainment of temperature differences across the membranes depends on the flow of the salt water being kept relatively slow. The resultant poor mixing results in large temperature drops across the salt water layers, which substract from the useful temperature drops across the membranes. Moreover, poor mixing results in stagnant concentrated salt water layers at the interface of the membrane and the warm salt water. These lower the vapor pressure of the interfacial salt water and decrease productivity. They may also become supersaturated and "wet out" the membrane, thereby contaminating the distillate with feed water. See German Offenlegungsschrift No. 30 05 192 to Cheng.

Another major deficiency of previous multi-effect distillation devices is that no means is provided for removal of the distillate so as to maintain a minimal thickness of the distillate layers. Because temperature drops across the distillate layers subtract from the temperature differences across the membranes, they decrease either the productivity or the performance ratio. U.S. Pat. No. 3,563,860 to Henderyckx discloses a distillation apparatus using permeable cellulose acetate membranes with an air gap being maintained between the membrane and a condensor wall. The necessity for a sizable air gap can limit the productivity of such a device, but without the air gap, distillate touching the cellulose acetate membrane would tend to pass through it back into the salt water by osmosis, and so the air gap must be large enough to prevent this. Because such a distillation device would have to be very long in order to recover a significant amount of latent heat, removal of the distillate would be a problem.

Possibly in appreciation of this potential problem, Henderyckx suggests forcing the distillate out by air pressure or by gravity. Considerable air pressure would be required if the gaps were thin, and the flow of air would be expected to blow out a good deal of warm water vapor as well as distillate and thus lower the productivity. Use of gravity would require large vertical spaces increasing the size and thus capital cost of the apparatus.

Neither of the above patents cites experimental evidence of a device which demonstrates either the productivity or the combined productivity and performance ratio necessary for low-cost distillation. Henderyckx gives a theoretical example of a distillation device of his design achieving a performance ratio of 48 by means of the extremely small driving temperature difference of 1° C. However, the productivity under these conditions is negligible and the device is really operating as a well insulated heat exchanger. Henderyckx does not give productivity figures in his calculations. Work with diffusion stills, however, has demonstrated that at a 50° C. average working temperature, the 7 mm vapor gap suggested by Henderyckx will allow only 0.03 gal/ft$^2$-day-torr of water vapor to diffuse through, or a total of 0.03×2.9 torr=0.087 gal/ft$^2$-day where the feed is seawater. This calculation does not include temperature drops across stagnant brine layers, across the distillate layer, across the cellulose acetate membrane, and across the condensor. Even if these other deleterious factors are not considered, the productivity is only one-twentieth that of a practical device. To be useful, a desalination process must demonstrate both good productivity and good energy efficiency.

SUMMARY OF THE INVENTION

A process and apparatus are provided for distilling a feed liquid containing a solute (e.g., salt) while conserving latent heat and thereby achieving high productivity and high performance ratios not attained in the prior art. In the process, hot salt water is passed rapidly across one side of a hydrophobic, microporous membrane. Water vapor but not liquid water passes through the membrane and condenses at the other side of the membrane in a chamber formed on one side by the membrane and on the other by a cool condensor sheet. The distillate formed flows in a thin layer in a direction concurrent to that of the hot salt water, and is drained at the same end of the device as is the hot (now cooled) salt water. In the course of its flow, the distillate gives up its heat to the condensor, which in turn is cooled by a rapid flow of salt water on the other side which moves in a direction counter to the flows of the hot salt water and the distillate. This cool salt water emerges from the cooling chamber quite warm, and after further heating by means of an external heater is returned to the membrane distillation module to become the hot salt water flow.

In accordance with the purpose of the invention as embodied and broadly described herein, the apparatus for the continuous distillation of a hot feed of an aqueous liquid containing a salt or other low volatility solute comprises a thermally conductive, water vapor impermeable sheet forming one longitudinal wall of a distillate collecting chamber; a hydrophobic microporous membrane forming an opposing longitudinal wall of the chamber; means for flowing the hot aqueous feed rapidly past, and in intimate contact with, the surface of the microporous membrane opposite the distillate collecting chamber, water vapor from the hot feed diffusing through the microporous membrane into the distillate collecting chamber; means for cooling the surface of the impermeable sheet opposite the distillate collecting chamber, the cooled sheet causing condensation of the diffused water vapor in the collecting chamber; and means for stripping condensed distillate from the distillate collecting chamber, the stripping means including (a) means using forces exerted by the flowing hot feed acting across the microporous membrane on the distillate sandwiched between the porous membrane and the impermeable sheet for causing distillate flow in the direction of feed flow, and (b) means for draining the distillate from the collecting chamber along the direction of hot feed flow.

Preferably, the cooling means includes means for flowing cold feed in a direction counter to the hot feed flow direction past the surface of the impermeable sheet opposite the collecting chamber, the cold feed temperature being low relative to that of the hot feed flowing past the microporous membrane, wherein the apparatus further includes heater means operatively connected between the cold feed flow means and the hot feed flow means for receiving the cold feed after having cooled the impermeable membrane, heating the received cold feed to the temperature of the hot feed flowing past the microporous membrane, and releasing the heated feed for flow past the microporous membrane.

It is also preferred that the distillate forcing means includes the impermeable sheet being made more stiff against bending in the direction normal to the sheet surface than the microporous membrane, the impermeable sheet and the microporous membrane being positioned for surface-contacting relationship when no liquid distillate is present in the collecting chamber, and a pressure gradient being maintained in the hot feed flow past the membrane with pressure decreasing along the flow direction, the microporous membrane locally deforming in the normal direction relative to this impermeable sheet during distillation operation to allow accumulation and passage of liquid distillate.

Still in accordance with the present invention, the method of continuously distilling a hot aqueous feed containing a salt or other low volatility solute comprises the steps of flowing the hot feed past one side of a microporous membrane; diffusing water vapor through the membrane; condensing the diffused water vapor using an impermeable membrane positioned on the side of the microporous membrane opposite the hot feed, the condensed vapor collecting in the chamber defined in part by the microporous membrane and the impermeable sheet; stripping the condensed and collected distillate from the chamber using forces exerted by the flowing hot feed flow acting across the microporous membrane on the distillate sandwiched between the membrane and the sheet, the forces causing distillate flow in the same direction as hot feed flow; and draining the flowing distillate from the collecting chamber along the direction of hot feed flow.

The accompanying drawing which is incorporated in, and constitutes a part of, this specification illustrates two embodiments of the invention and, together with the description, serves to explain the principles of the invention.

BRIEF DESCRIPTION OF THE DRAWING

FIG. 1A is a schematic cross-sectional view of a linear distillation module made in accordance with the present invention;

FIG. 1B is a schematic detail of a part of the embodiment shown in 1A;

FIG. 2A is a schematic cross-sectional view of a portion of a spiral-shaped distillation module made in accordance with the present invention;

FIG. 2B is a schematic of the part of the spiral module not shown in 2A; and

FIG. 3 is a schematic detail of a part of the spiral module shown in 2A.

DETAILED DESCRIPTION OF THE PREFERRRED EMBODIMENT

Reference will now be made in detail to the present preferred embodiment of the invention, examples of which are illustrated in the figures of the accompanying drawing.

In accordance with the invention, the apparatus for the continuous distillation of a feed of an aqueous liquid containing a salt or other non-volatile solute comprises a thermally conductive, water vapor impermeable sheet forming one longitudinal wall of a distillate collecting chamber. As embodied herein, and with reference to FIG. 1A which depicts a linear distillation apparatus made in accordance with the present invention, and generally designated 10, water vapor impermeable sheet 12 is positioned on one side of distillate collecting chamber 14 so as to form one wall of the chamber. Preferably, sheet 12 is made of a metal sheet or a thin plastic film such as high density polyethylene with a thickness ranging from about 0.001 inch to about 0.005 inch. This range will give sufficient strength to the sheet, for reasons which will become evident from the subsequent discussion, as well as provide an acceptably low thermal resistance to the passage of heat. Low thermal resistance is important because sheet 12 acts as the condensor element for the distillation unit 10 as also will become apparent from the subsequent discussion.

Further in accordance with the present invention, a hydrophobic microporous membrane is provided and positioned to form an opposing longitudinal wall of the distillate collecting chamber. As embodied herein, and with continued reference to FIG. 1, microporous membrane 16 is shown forming the other longitudinal wall of distillation collection chamber 14. Preferably, microporous membrane 16 is a microporous polytetrafluoroethylene (PTFE) membrane having a thickness of from about 0.001 inch to about 0.005 inch and having a void fraction of from about 80% to about 90%. A satisfactory microporous PTFE membrane product is disclosed in U.S. Pat. No. 3,953,566 to Gore, although other hydrophobic microporous membrane materials can be utilized, such as microporous polypropylene.

Further in accordance with the invention, means are provided for flowing the hot aqueous feed rapidly past, and in intimate contact with, the surface of the microporous membrane opposite the distillate collecting chamber. As embodied herein, and with continued reference to FIG. 1A, opposing longitudinal wall 18 is provided facing microporous membrane 16 and together form hot feed flow chamber 20. Longitudinal wall 18 can be fabricated from any material having sufficient rigidity to contain and channel the hot feed flow. In some distillation applications, longitudinal wall 18 can be replaced with another microporous membrane similar to microporous membrane 16 which, with an associated condensor sheet can form another, parallel distillate collection chamber to be fed from the same hot feed flowing in chamber 20. The spiral distillation apparatus pictured in FIG. 2A, to be discussed hereinafter, essentially utilizes such a construction.

In the FIG. 1A embodiment, there is provided pump 22 operatively connected to provide hot feed flow in one longitudinal direction through inlet 24 into chamber 20 and then rapidly past microporous membrane 16 (left to right in FIG. 1, as shown by the arrows). It is important that the hot feed intimately contact the surface of membrane 16 for reasons that will become apparent from the succeeding discussion. Pump 22 and inlet 24 are conventional and one of ordinary skill in the art would readily be able to select and adapt suitable components for use in the apparatus of the present invention. As a result of the flow induced by pump 22, the hot aqueous feed flows into chamber 20 and rapidly past microporous membrane 16. Water vapor evaporating from the feed diffuses through microporous membrane 16 into distillate collection chamber 14 where it is condensed and collected.

Further in accordance with the present invention, means are provided for cooling the impermeable sheet opposite the distillate collection chamber. As embodied herein and as shown in FIG. 1A, longitudinal wall 28 is provided facing condensor sheet 12 on the side opposite microporous membrane 16. Wall 28, together with sheet 12, forms chamber 30 for holding a cold fluid used to cool condensor sheet 12.

Preferably, and in order to achieve latent heat recovery from the condensing distillate, the cold fluid is aqueous feed at a lower temperature than the hot feed flowing in chamber 20, and that the cold feed is flowing in a direction counter to the hot feed flow direction in chamber 20. Because of the continuous cooling of condensor sheet 12, the vapor diffusing through microporous membrane 16 condenses, at least initially, on condensor sheet 12. After the formation of a film of liquid distillate, vapor may condense in the liquid distillate film, but it is understood that the heat of vaporization is intended to be eventually transferred through the condensor sheet 12 to the cold feed flowing in chamber 30. Also, it should be understood that the condensed distillate in collection chamber 14 is always physically contacted on one side by membrane 16 and on the other by condensor sheet 12 and is, in effect, "sandwiched" between membrane 16 and sheet 12.

In the apparatus in FIG. 1A, pump 32 is positioned to receive cold feed from a source (not shown) and is operatively connected to distillation unit 10 to introduce the cold feed to chamber 30 through inlet 34. After flowing past condensor sheet 12 the cold feed (now warm) exits chamber 30 through outlet 36. Preferably, the warmed cold feed exiting from chamber 30 at outlet 36 is subsequently heated, such as by heater 38 as is shown in FIG. 1A, and is used to augment or provide the entire amount of the hot feed for introduction to chamber 20 via pump 22 and inlet 24.

One of ordinary skill in the art would also appreciate that a plurality of the distillation units or modules 10 shown in FIG. 1A can be used as series or parallel stages in distillation apparatus of various configurations. For instance, as depicted schematically by broken lines in FIG. 1A, it may be advantageous to form longitudinal wall 28 out of the same type of material used for condensor sheet 12 and use wall 28 for the condensor sheet of another distillation module, cooled by the same cold feed flow stream. One of ordinary skill in the art also would realize that various flow inter-connections can be used between the several stages depending upon the relative temperatures of the hot and cold feed flows exiting and entering the individual units in order to achieve efficient utilization and conservation of the heat energy used to vaporize the aqueous liquid.

Further in accordance with the present invention, means are provided for stripping the condensed and collected distillate from the distillate collecting chamber using forces exerted by the flowing hot feed acting across the microporous membrane on the distillate sandwiched between the microporous membrane and the impermeable sheet, the forces causing distillate flow in the same direction as the hot feed flow. As embodied herein, microporous membrane 16 is mounted so that the membrane 16 contacts the surface of condensor sheet 12 when no distillate is present in chamber 14, such as during start-up or when the distillate film has been momentarily stripped away from a particular location on the condensor sheet 12 by the action of the flowing hot feed. Additionally, the materials and thicknesses of microporous membrane 16 and condensor sheet 12 are selected such that condensor sheet 12 is stiffer in bending in the direction normal to the surface of condensor sheet 12 than is microporous membrane 16. The difference in comparative bending stiffnesses causes the microporous membrane to deform locally in a direction normal to the surface of condensor sheet 12 to accommodate an accumulation of condensed distillate while the condensor sheet 12 remains comparatively undeformed from its position prior to the accumulation of condensed distillate.

For distillation units made in accordance with the present invention and using a rigid sheet material, such as sheet metal, for condensor sheet 12, the desired comparative bending flexibility can be easily satisfied. Most materials suitable for microporous membrane 16, especially the preferred expanded PTFE membrane material, and in the thickness range from about 0.001 inch to about 0.05 inch, are exceedingly flexible and pliable, and one of ordinary skill in the art can easily select materials and thicknesses from among the materials available for distillation application.

In conjunction with the aforementioned comparative characteristics and positioning of membrane 16 and condensor sheet 12, and as embodied herein, the stripping means includes a pressure gradient being provided along the direction of hot feed flow in chamber 20, the pressure decreasing from inlet 24 to outlet 26. The cross-sectional dimensions of chamber 20 can be selected in regard to the desired volumetric flow rate of the hot feed through chamber 20 and the capacity of pump 22 chosen to provide the desired pressure gradient. Preferably, means are provided in channel 20 to provide additional turbulence and mixing in the flowing hot feed, such as by spacer 50 shown in FIG. 1B.

Spacer 50 includes an interconnected network of longitudinal strands 52 and transverse strands 54. Longitudinal strands 52 serve to separate membrane 16 and wall 18, so as to provide flow spaces for the feed in chamber 20, while strands 54 serve to position strands 52. Transverse strands 54 are considerably smaller in diameter than strands 52. The reduced size of strands 54 is necessary to allow the formation of collection chamber 14 by deformation of membrane 16 while simultaneously increasing the turbulence along chamber 20. Of course, the dimensions of spacer 50 should be selected not to unduly increase the pressure gradient as an overall decrease in efficiency could result due to the necessity for increased pumping power and thickness of condensor sheet 12 to withstand any static pressure imbalance between chambers 20 and 30. Spacer 50 also functions to increase mixing in chamber 20 and prevent the buildup of stagnant cool layers of feed adjacent membrane 16.

Conventional spacers used in reverse osmosis and ultrafiltration do not work well, because they do not allow membrane 16 to separate from the condensor sheet 12 in a continuous line along the chamber 20. Distillate becomes trapped and cannot flow under membrane 16 to outlet 40. A channel spacer which was found to perform adequately in distillation modules made in accordance with this invention is one made from back-to-back layers of Conwed ®XN2170 netting, a construction which exhibits the cross section shown in FIG. 1B. Hot feed and distillate flow into the page in this perspective.

Further in accordance with the present invention, the distillate flowing in the collecting chamber is drained along the direction of the hot feed flow. As embodied herein and shown in FIG. 1A, outlet 40 is provided to drain the distillate from collecting chamber 14. Outlet 40 is positioned at the longitudinal end of distillate collection chamber 14 in the direction of the hot feed flow in chamber 20. It has been found that this location for the drainage for distillate collection chamber 14 acting together with the arrangement and construction of the microporous membrane 16, condensor sheet 12, and flow direction of the hot feed in chamber 20 act to provide a surprising and unexpectedly high productivity in terms of the quantity of distillate produced, the heat energy expended for vaporization, and overall size of the distillation unit. Although the physical phenomenon responsible for the surprising and unexpectedly high productivity is only partially understood at the present time, the following discussion will enable one of ordinary skill in the art to appreciate the phenomenon and understand the importance of these features to the operation of the invention.

When apparatus made in accordance with distillation unit 10 is first started, the membrane 16 and the sheet 12 are to be touching one another. Water vapor will condense initially not in the distillate, but on the sheet 12. As distillate accumulates in collection chamber 14 it will intrude between the membrane 16 and sheet 12, creating a space for itself. After a short time a continuous sheet of distillate will separate membrane 16 from condensor sheet 12. Applicants have discovered through actual testing that forces induced by the rapid flow of the hot feed in chamber 20 apparently act across membrane 16 to drive or "milk" the distillate towards outlet 40 positioned at the low pressure end of chamber 20. This "milking" of the distillate, where relatively large amounts of distillate are being produced, was found to take the form of a series of ripples or waves in membrane 16 which actually can be observed if the wall 18 is transparent. The distillate thus accumulates at the low pressure end of chamber 14 and is drained via outlet 40. The somewhat concentrated and cooled "hot" feed leaves distillation module 10 at outlet 26 and is either discarded or partially recycled to inlet 34.

The method and apparatus for removing the distillate by stripping using the forces induced by the flowing feed is important in determining the practicality of the distillation device of the present invention. The apparatus and process of this invention results in a distillate layer which is minimally thin. A thin distillate layer ensures good transfer of latent heat to condensor sheet 12, thereby enhancing the temperature drop across membrane 16 and increasing productivity. Because the distillate always is in intimate contact with condensor sheet 12, the distillate itself emerges from the device cool, having given up its heat energy to the cold feed flowing in chamber 30. Very high performance ratios are thus possible with devices made in accordance with the present invention.

One other advantage of the present method and apparatus for achieving distillate drainage is that microporous membrane 16 is suspended between two bodies of liquid (i.e., the heated feed and the distillate) which have essentially equal static pressures across membrane 16 at any given point along the hot feed flow direction, although a pressure gradient exists along the hot feed flow direction as explained previously. This results in minimal mechanical stress to microporous membrane 16, because it is not resisting a large hydrostatic head. Although in general the static pressures in the chambers 30 and 20 are not equal, any load caused by non-equal pressures is carried almost entirely by condensor sheet 12 because of the slack in membrane 16.

The use of a thin, flexible condensor sheet 12 in conjunction with highly flexible microporous membrane 16 may result in some bulging or movement of condensor sheet 12 in response to any difference in the static pressure between chamber 20 and chamber 30 in the distillation unit shown in FIG. 1A. In such a case, the ends of the sheet 12 and membrane 16 are generally constrained against movement by the mounting arrangement (not shown) with the result that the pressure induced forces must be carried by the sheet 12 stressed in tension. The condensor sheet 12 carries essentially the entire hydrostatic load, leaving membrane 16 relatively untensioned and comparatively pliable and flexible.

In summary, microporous hydrophobic membrane 16 should be thin and highly porous in order to facilitate diffusion of water vapor. It should exhibit low thermal conductivity to minimize conductive heat flow from the heated feed to the cooled distillate. Pore size should be small enough to resist entry of water at feed static pressures over long periods of time, at elevated temperatures. The membrane should be strong and abrasion-resistant even at temperatures of 100° C., and should resist chemical and biological attack. Flexibility is necessary so that it can move to accommodate distillate flow.

The condensor sheet 12 should be impermeable, heat conductive, resistant to corrosion by salt water and to biological attack, and low in cost. It may be a laminated material, such as polyethylene-coated aluminum sheet. Because the condensor sheet 12 must carry virtually all the load resulting from pressure differentials within the device, it must show high tensile strength.

EXAMPLE 1

The "milking" phenomenon described above was explored experimentally by use of salt water feed in a linear still of a configuration similar to that in FIG. 1A. Clear plexiglas sheet formed longitudinal walls 18 and 28 of the device and the feed chambers 20 and 30 were filled with spacers similar to that shown in FIG. 1B formed from Conwed ®XN2170 netting. Condensor sheet 12 in FIG. 1 was made of 0.003" thick high density polyethylene, and microporous membrane 16 was a 0.004" thick hydrophobic PTFE film with 0.45 micron pores available from W. L. Gore & Associates, Inc. under the designation 5C.2.

The test apparatus differed from that of FIG. 1A in that an additional distillate drainage port was provided at the high pressure end of chamber 20, between outlet 36 and inlet 24. When this still was run with two distillate ports provided, 98 percent of the distillate drained out of the port corresponding to outlet 40 nearest the hot feed outlet 26. When the port corresponding to outlet 40 was deliberately blocked, the distillate production of the device decreased from 12.4 ml/min. to 4.7 ml/min. In looking through the clear plastic walls of the device, the microporous membrane appeared bloated. Opening of the blocked port resulted in a gush of distillate exiting under pressure. It is surprising, then, to discover the importance of draining the distillate in the same direction as the hot salt water feed flow.

This experiment demonstrated that even when condensor sheet 12 is a relatively thin, flexible plastic sheet, the direction of milking of the distillate depends on the direction of the hot feed flow along microporous membrane 16, not on the direction of cold feed flow on the other side of condensor sheet 12. It is thought that this results from the fact that even though condensor sheet 12 is somewhat flexible, condensor sheet 12 is taut due to static pressure differences between hot feed chamber 20 and cold salt water feed chamber 30. Because of the higher stress of sheet 12 in tension compared to membrane 16, virtually all the load is carried by the condensor sheet 12; this leaves the membrane free to locally deform under the forces induced by the feed flow and the distillate to be milked towards outlet 40.

A major disadvantage of a linear device such as that depicted in FIG. 1A is that lengths of a hundred feet or more become awkward and expensive to insulate. Moreover, the pressures necessary to drive the feed and ensure good mixing may require elaborate bracing in a linear embodiment of the invention. For these reasons, a preferred distillation module of this invention uses a spiral-wrapped geometry such as the one designated generally as 110 and depicted in FIG. 2A. In the succeeding discussion, elements of spiral module 110 that correspond functionally with elements in the previously discussed linear module 10 (FIG. 1A) have been given like reference numbers but with the base 100.

Cold feed is pumped into the module at inlet 134 and spirals into the center through the chamber 130, picking up heat from condensor sheets 112a and 112b as it flows. This cold feed, now warmed by the recovered latent heat of condensation of the distillate, exits from the module at outlet 136, is heated further by heater 138, and then is returned to the chamber 120 via inlet 124. A pump such as pump 122 shown in FIG. 2B can be located in the flow connection between outlet 136 and inlet 124 to provide a driving force for the hot and cold feed. The hot feed flow then spirals outward through chamber 120, which is lined on both sides with hydrophobic microporous membranes 116a, 116b.

During its transit of chamber 120, a part of the feed evaporates through the membranes 116a, 116b, and distillate collects in the parallel distillate chambers 114a, 114b formed by membranes 116a, 116b and the adjacent respective condensor sheets 112a, 112b. This distillate spirals outward in two thin flows, milked along by the hot feed flow in chamber 120, and collects in distillate headers 140a, 140b from which it is withdrawn from spiral module 110. The somewhat concentrated and cooled hot feed exiting outlet 126 is either discarded, pumped as feed to another module, or partially recycled to inlet 134.

Twin-membrane and twin-condensor distillation unit configurations such as shown in FIG. 2A can offer a space savings, since only half the number of channels are needed for a given area of microporous membrane. Moreover, the length of the channels necessary to achieve a given performance ratio need be only about half as great as for distillation modules such as module 10 shown in FIG. 1A.

The height of the spiral-wound module as measured along the axis of the spiral does not effect appreciably the performance ratio, but only the amount of feed required, the amount of heat required, and the amount of distillate produced, all of which scale linearly with height. The performance ratio increases for a given operating temperature range and feed flow rate as additional wraps are added to the module. But additional wraps add additional length which acts to decrease the amount of distillate produced per unit area of membrane per unit time. Increasing the feed flow rate for a given module working between set temperatures increases the productivity at the expense of performance ratio. As one of ordinary skill in the art would appreciate, these tradeoffs must be weighed when a distillation module is designed so as to provide the best performance for a given need. The productivity and performance ratio tradeoff allows for a certain flexibility in operation of the module so that unusual periods of demand for distillate can be temporarily met without large capital expenditures.

In general, the pressure of the hot feed in chamber 120 is not the same as that of the cold feed in chamber 130. Preferably, to prevent collapse of the lower-pressure chamber, spacers such as spacer 150 shown in the section of hot feed chamber 120 depicted in FIG. 3, can be used in one or preferably both of the feed flow chambers. As in the embodiment shown in FIGS. 1A and 1B, these spacers serve the added function of acting as turbulence promoters. Also, better mixing is accomplished with spacer 150.

Spacer 150 includes an interconnected network of longitudinal strands 152 and transverse strands 154. Longitudinal strands 152 serve to hold apart the microporous membranes 116a, 116b and condensor sheets 112a, 112b, so as to provide flow spaces for the feed in chamber 120. Transverse strands 154 are considerably smaller in diameter than longitudinal strands 152, and serve simultaneously to hold longitudinal strands 152 in their places, to provide room for local deformation of membranes 116a, 116b, to form distillate chambers 114a and 114b, to increase the turbulence in chamber 120, and to promote mixing of the salt water feed in the hot feed flow chamber 120. This mixing prevents the formation of thick, relatively cool layers of concentrated hot feed along the membranes 116a, 116b. A built-up spacer using back-to-back layers of Conwed ®XN2170 netting was found to perform satisfactorily for spacer 150.

Chamber spacers for the hot feed chamber preferably should be made of materials such as plastic which are resistant to corrosion and which do not hydrolize or collapse in hot aqueous solutions. Longitudinal strands 152 should either be rubbery or very smooth so as to prevent puncture of membranes 116a, 116b.

Cold feed chamber spacers (not shown), which do not come into contact with membranes 116a, 116b, can have the configuration of spacer 150 shown in FIG. 3 or the configuration of conventional spacers such as Vexar ® made by the DuPont Co.

EXAMPLE 2

A membrane distillation module similar in configuration to spiral module 110 depicted in FIGS. 2 and 3 was constructed using salt water as a feed and chamber 120, 130 lengths of 64 feet. The microporous membranes and condensor sheets were six inches wide, so that the overall height of the module was about six inches. Condensor sheets 112a, 112b were 0.008" thick 1145 alloy H-19 aluminum, and membranes 116a, 116b were 0.004" thick porous PTFE membranes each with an effective pore size of about 0.45 microns available from W. L. Gore & Associates, Inc. under the designation 5C.2. The hot and cold feed chambers both utilized as a spacer two back-to-back layers of Conwed XN-2170 netting. The hot and cold feed chambers were each 0.17" thick, and the overall module diameter came to 20 inches. To assemble the module, a single PTFE membrane strip was first joined at the edges to a single aluminum strip using double-stick tape. The temporarily joined strips were then folded so that the membrane faced itself, the folded assembly was loosely rolled to produce the spiral, and the header connections made. The bottom and top of the module were then potted with epoxy so that the potting layer extended ½ inch into the top and bottom, leaving five inches of effective membrane and condensor width.

Test 101-0 ran 0.75 gpm of 4 percent salt water feed at 27.6° C. into the test module via inlet 134 in FIG. 2. The feed emerged from outlet 136 at 81.7° C., after which the feed was heated by electrical resistance heaters to 85.6° C. and pumped back into the module through inlet 124. The salt water emerged from the hot feed chamber through outlet 126 at a temperature of 31.6° C. Over a three minute run of the stabilized system, 659 milliliters of distillate showing a conductivity of 15 micromhos/cm were drained from the distillate headers 140a, 140b. The productivity was then 1.56 gal/ft²day, or 83.5 gal/day. The performance ratio was 11. This performance ratio could have been increased by using longer flow channels. Both productivity and performance ratio could have been increased by raising the heater temperature. The combined high productivity ahd high performance ratio shown here is well beyond that demonstrated by the prior art in membrane distillation, and makes membrane distillation a useful means of desalination.

In summary, there are four elements important to a latent heat-conserving embodiment of this invention:

(1) Counter-current flow of cold incoming salt water in respect to the flow of hot salt water. This is necessary for conservation of latent heat energy.

(2) Rapid flow of hot salt water to provide mixing and turbulence, which improve heat transfer and prevent high salt concentrations at the surface of the hydrophobic microporous membrane. This rapid flow also ensures the rapid expulsion of the distillate.

(3) A thin hydrophobic microporous membrane in direct contact with both the hot salt water feed and the distillate, which allows maximal flow of water vapor and yet prevents contamination of the distillate by the feed water.

(4) A flow of distillate which is driven by the flow of hot salt water so that the two flows are concurrent. This is necessary to ensure a thin distillate layer and hence a minimal barrier to heat flow. This also causes the distillate to give up its sensible heat. Very high performance ratios can only be achieved by devices which produce cool distillate.

In addition to these primary elements, two other elements appear to be highly useful:

(1) Spacers for the salt water channels which enhance mixing, resist compression of the channel, and, for the hot salt water channel, allow free flow of the distillate in a direction concurrent to the flow of hot salt water.

(2) A spiral-wound configuration which permits long channel lengths in a small volume, which resists moderate water pressures, and which requires little thermal insulation.

It will be seen that this invention can be adapted to many different applications, including situations where the cost of energy may be low, as with solar heaters or energy conversion systems using oceanic temperature gradients, and situations where the heat supplied is expensive as, for example, with electrical heaters or combustion of fossil fuels.

The present invention which can be used to construct devices for distilling salt water to produce fresh water is an important breakthrough in this field. The performance of present invention is many-fold greater than that of former devices which failed to bring together the elements necessary for a commercially useful membrane distillation device.

What is claimed is:

1. Apparatus for the continuous distillation of a feed of a hot aqueous liquid containing a low volatility solute such as salt comprising:
    a thermally conductive, water vapor impermeable sheet forming one longitudinal wall of a distillate collecting chamber;
    a hydrophobic microporous membrane forming an opposing longitudinal wall of said chamber;
    means for flowing the hot aqueous feed past, and in intimate contact with, the surface of said microporous membrane opposite the distillate collecting chamber, water vapor from the hot feed diffusing through said microporous membrane into said distillate collecting chamber;

means for cooling the surface of said impermeable sheet opposite the distillate collecting chamber, the cooled sheet causing condensation of the diffused water vapor in the collecting chamber, the condensed distillate being in intimate contact with both said sheet and said membrane; and means for stripping condensed distillate from said distillate collecting chamber, said stripping means including
  (a) means using forces exerted by the hot flowing feed acting across said microporous membrane on the distillate sandwiched between said porous membrane and said impermeable sheet for causing distillate flow in the direction of hot feed flow, wherein said distillate forcing means includes means for stiffening each impermeable sheet against deformation in the direction normal to its surface relative to the respective microporous membrane, said more stiff impermeable sheet and said less stiff microporous membrane being positioned in surface-contacting relationship when no liquid distillate is present in said collecting chamber, said less stiff microporous membrane being locally deformable away from said more stiff impermeable sheet during distillation operation by forces induced by the flowing hot feed to allow passage of liquid distillate, and
  (b) means for draining the distillate from the collecting chamber along the direction of hot feed flow.

2. Apparatus as in claim 1 wherein said cooling means includes means for contacting said impermeable sheet on the surface opposite the collecting chamber with cold aqueous feed at low temperature relative to the hot feed flowing past said microporous membrane, the apparatus further including means for flowing said cold feed past said impermeable membrane opposite surface in the opposite direction from the hot feed flow past said microporous membrane.

3. Apparatus as in claim 2 including heater means operatively connected to said cold feed flow means and said hot feed flow means for receiving the cold feed after it has cooled said impermeable membrane, further heating said received cold feed to the temperature of the hot feed flowing past said microporous membrane, and introducing said heated feed for flow past said microporous membrane.

4. Energy efficient apparatus for the continuous distillation of a feed of hot aqueous liquid containing a low volatility solute such as salt comprising:

a thermally conductive, water vapor impermeable sheet forming one longitudinal wall of a distillation collecting chamber;

a hydrophobic microporous membrane forming an opposing longitudinal wall of said chamber;

means for rapidly flowing the hot aqueous feed past, and in intimate contact with, the surface of said microporous membrane opposite the distillate collecting chamber, water vapor from the hot feed diffusing through said microporous membrane into said distillate collecting chamber;

means for cooling the surface of said impermeable sheet opposite the distillate collecting chamber, the cooled sheet causing condensation of the diffused water vapor in the collecting chamber, the condensed distillate film being in intimate contact with both said sheet and said membrane, said cooling means including
  (a) means for flowing past said impermeable sheet cold aqueous feed at a temperature lower than that of the hot feed flowing past said membrane, the direction of flow of said cold feed being counter to that of the hot feed, and
  (b) means for recovering the latent heat of the condensing distillate absorbed by said cold feed; and means for stripping condensed distillate from said distillate collecting chamber, said stripping means including
  (a) means using forces exerted by the rapidly flowing hot flowing feed acting across said microporous membrane on the distillate sandwiched between said porous membrane and said impermeable sheet for causing distillate flow in the direction of hot feed flow, wherein said distillate forcing means includes means for stiffening each impermeable sheet against deformation in the direction normal to its surface relative to the respective microporous membrane, said more stiff impermeable sheet and said less stiff microporous membrane being positioned in surface-contacting relationship when no liquid distillate is present in said collecting chamber, said less stiff microporous membrane being locally deformable away from said more stiff impermeable sheet during distillation operation by forces induced by the flowing hot feed to allow passage of liquid distillate, and
  (b) means for draining the distillate from the collecting chamber along the direction of hot feed flow, said stripping means preventing thick layers of distillate from forming in said distillate collecting chamber and allowing said distillate to give up its sensible heat to said cold feed.

5. Apparatus for the distillation of a hot feed of an aqueous liquid containing a low volatility solute such as salt comprising:

first and second thermally conductive, water vapor impermeable sheets positioned in spaced side-by-side relationship;

first and second microporous membranes positioned in spaced side-by-side relationship between said impermeable sheets, each of said microporous membranes together with the proximate respective impermeable sheet forming opposing longitudinal walls of first and second distillate collection chambers;

means for flowing the hot feed between and in intimate contact with said first and second microporous membranes, water vapor from the hot feed diffusing through said membranes into the respective collecting chambers;

means for cooling said first and second impermeable sheets, said cooled sheets causing the diffused vapor to condense and collect in the respective collecting chambers, the condensed distillate being intimately in contact with the both the membrane and the sheet forming the respective collecting chamber; and means for stripping the condensed distillate from said collecting chambers, said stripping means including (a) means using forces exerted by the hot flowing feed acting across said first and second microporous membranes on the distillate sandwiched between each of said first and second microporous membranes and the respective one of said first and second impermeable sheets for causing distillate flow in the direction of the hot feed flow, wherein said distillate forcing means includes means for stiffening each impermeable sheet against deformation in the direction normal to its surface relative to the respective microporous membrane, said more stiff impermeable sheet and said less stiff microporous membrane being positioned in surface-contacting relationship when no liquid distillate is present in said collecting chamber, each of said less stiff microporous membranes being locally deformable away from said respective more stiff impermeable sheet during distillation operation by forces induced by the flowing hot feed to allow passage of liquid distillate, and (b) means for draining the distillate from the collecting chambers along the direction of hot feed flow.

6. Apparatus as in claim 5 wherein said cooling means includes means for flowing cold feed past said impermeable sheets in a direction counter to the hot feed flow direction, the cold feed temperature being low relative to that of the hot feed flowing past the microporous membranes.

7. Apparatus as in claim 6 formed in a spiral having the spiral axis transverse to the hot feed flow direction, said first impermeable sheet overlapping said second impermeable sheet in said spiral, the overlapping adjacent portions of said first and said second impermeable sheets being spaced and defining the flow path for the cold feed.

8. Apparatus comprising a plurality of distillation units as defined by claim 6, said units arranged in parallel with adjacent impermeable sheets of adjacent units being spaced and defining the flow path for the cold feed between the respective units.

9. Apparatus as in claim 4, 7, or 8 further including heater means for receiving the cold feed after it has cooled the impermeable sheets, heating the cold feed to the temperature of the feed flowing past the microporous membranes, and introducing the heated feed for subsequent flow past said microporous membranes, said heater means being operatively connected to said cold feed flow means and said hot feed flow means.

10. Apparatus as in claim 1, 4 or 5 wherein said stiffening means is an impermeable sheet thickness dimension and material selected such that said sheet is stiffer in bending than said microporous membrane.

11. Apparatus as in claim 1, 4 or 5 wherein said stiffening means includes means for constraining the respective edges of each impermeable sheet and associated microporous membrane such that each microporous membrane has less tension relative to the associated impermeable sheet and means for maintaining during operation a difference in static pressure across each impermeable sheet for tensioning the impermeable sheet relative to the associated microporous membrane, said relatively tensioned sheet thereby becoming stiffer against bending than the associated membrane.

12. Apparatus as in claim 1, 4 or 5 wherein a pressure gradient is maintained in said hot feed flow such that static pressure decreases along the direction of hot feed flow.

13. Apparatus as in claim 1, 4 or 5 wherein means are provided in the stream of hot feed flowing past each membrane to provide turbulence and mixing.

14. Apparatus as in claim 13 wherein hot feed flowing means includes opposing wall means defining in part a hot feed flow chamber together with said membrane, wherein said mixing means includes an element for spacing said membrane away from said opposing wall means.

15. Apparatus for the distillation of a hot feed of an aqueous liquid containing a low volatility solute such as salt comprising:

first and second thermally conductive, water vapor impermeable sheets positioned in spaced side-by-side relationship;

first and second microporous membranes positioned in spaced side-by-side relationship between said impermeable sheets, each of said microporous membranes together with the proximate one of said impermeable sheets forming a respective distillate collecting chamber;

means for flowing the hot feed between and in intimate contact with both said first and second microporous membranes, water vapor from the hot feed diffusing through said membranes into the respective collecting chambers;

spacer means for separating said first and second microporous membranes and for promoting turbulence and mixing in said hot feed flowing therebetween;

means for cooling said first and second impermeable sheets, said cooled sheets causing the diffused vapor to condense and collect in the respective collecting chambers, the condensed distillate being intimately contacted by both the membrane and the sheet forming the respective collecting chamber; and means for stripping the condensed distillate from said collecting chambers, said stripping means including (a) means using forces exerted by the flowing hot feed acting across said first and second microporous membranes on the distillate sandwiched between each of said first and second microporous membranes and the respective one of said first and second impermeable sheets for causing distillate flow in the direction of the hot feed flow, wherein a pressure gradient is maintained in the hot feed flow between said membranes with the static pressure decreasing along the direction of hot feed flow, and (b) means for draining the distillate from the collecting chamber along the direction of hot feed flow, wherein said spacer means includes a plurality of first ribs extending longitudinally in the feed flow direction; and a plurality of second ribs extending transversely to the feed flow direction and attached to, and transversely spacing, said first ribs, said first ribs being sized and configured to provide the required separation, and said second ribs being sized and configured to provide turbulence and to mix the feed flowing past said second ribs.

16. Apparatus for the distillation of a hot feed of an aqueous liquid containing a low volatility solute such as salt comprising:

first and second thermally conductive, water vapor impermeable sheets positioned in spaced side-by-side relationship;

first and second microporous membranes positioned in spaced side-by-side relationship between said impermeable sheets, each of said microporous membranes together with the proximate one of said impermeable sheets forming a respective distillate collecting chamber;

means for flowing the hot feed between and in intimate contact with both said first and second microporous membranes, water vapor from the hot feed diffusing through said membranes into the respective collecting chambers;

spacer means for separating said first and second microporous membranes and for promoting turbulence and mixing in said hot feed flowing therebetween;

means for cooling said first and second impermeable sheets, said cooled sheets causing the diffused vapor to condense and collect in the respective collecting chambers, the condensed distillate being intimately contacted by both the membrane and the sheet forming the respective collecting chamber; and means for stripping the condensed distillate from said collecting chambers, said stripping means including (a) means using forces exerted by the flowing hot feed acting across said first and second microporous membranes on the distillate sandwiched between each of said first and second microporous membranes and the respective one of said first and second impermeable sheets for causing distillate flow in the direction of the hot feed flow, wherein a pressure gradient is maintained in the hot feed flow between said membranes with the static pressure decreasing along the direction of hot feed flow, and (b) means for draining the distillate from the collecting chamber along the direction of hot feed flow, wherein said spacer means also contacts and separates said first and second impermeable sheets through the respective microporous membranes, said spacer means contacting said impermeable sheets intermittently in the transverse direction.

17. Apparatus as in claim 16 wherein said spacer means includes a plurality of first ribs extending longitudinally in the feed flow direction; and a plurality of second ribs extending transversely to the feed flow direction and attached to, and transversely spacing, said first ribs, said first ribs being sized and configured to provide the required separation, and said second ribs being sized and configured to provide turbulence and to mix the feed flowing past said second ribs.

18. Apparatus as in claim 15 wherein the portions of said first ribs contacting said microporous membranes are configured to prevent damage to said membranes.

19. Apparatus as in claim 1, 4, 5 or 15 wherein each microporous membrane is expanded polytetrafluoroethylene having a void content of from about 80% to about 90% and a thickness from about 0.001 inches to about 0.005 inches.

20. Apparatus as in claim 19 wherein each impermeable sheet is polyethylene sheet having a thickness from about 0.001 inches to about 0.005 inches.

21. Method of continuously distilling a hot aqueous feed containing a low volatility solute such as salt comprising the steps of:

(a) flowing the hot feed past, and in intimate contact with, one side of a microporous membrane;

(b) diffusing water vapor through the membrane;

(c) condensing the diffused water vapor using an impermeable sheet positioned on the side of the microporous membrane opposite the hot feed, the condensing step including the steps of collecting the condensed vapor in the chamber defined in part by the microporous membrane and the impermeable sheet, and intimately contacting both the membrane and the sheet with the collected distillate;

(d) stripping the condensed and collected distillate from the chamber using forces exerted by the hot flowing feed flow acting across the microporous membrane on the distillate sandwiched between the membrane and the sheet, the forces causing distillate flow in the same direction as hot feed flow, said stripping step including the step of locally deforming the microporous membrane relative to the impermeable sheet and in a direction normal to the sheet to allow passage of the distillate in the direction of the hot feed flow; and (e) draining the flowing distillate from the collecting chamber along the direction of hot feed flow.

22. Method as in claim 21 including the preliminary steps of stiffening the sheet relative to the membrane in respect to deformation in the direction normal to the sheet to provide deformation substantially in the membrane during distillate accumulation in the chamber, and positioning the sheet and the membrane in surface-contacting relationship when no liquid distillate is present in the collecting chamber.

23. Method as in claim 21 or 22 further including the step of maintaining a pressure gradient in the flowing feed, the static pressure decreasing along the direction of the feed flow.

24. Method of efficiently and continuously distilling a hot aqueous feed containing a low volatility solute such as salt comprising the steps of:

(a) rapidly flowing the hot feed past, and in intimate contact with, one side of a microporous membrane;

(b) diffusing water vapor through the membrane;

(c) condensing the diffused water vapor using a thermally conductive impermeable sheet positioned on the side of the microporous membrane opposite the hot feed, the condensing step including the steps of collecting the condensed distillate in the chamber defined in part by the microporous membrane and the impermeable sheet, and intimately contacting both the membrane and the sheet with the collected distillate;

(d) stripping the condensed and collected distillate from the chamber using forces exerted by the rapidly flowing hot feed flow acting across the microporous membrane on the distillate sandwiched between the membrane and the sheet, the forces causing distillate flow in the same direction as hot feed flow, said stripping step including the step of locally deforming the microporous membrane relative to the impermeable sheet and in a direction normal to the sheet to allow passage of the distillate in the direction of the hot feed flow, said stripping step maintaining the condensed distillate in relatively thin layers for efficient transfer of the sensible heat to the sheet;

(e) draining the flowing distillate from the collecting chamber along the direction of hot feed flow; and (f) recovering the latent heat of condensation of the distillate, said latent heat recovering step including the steps of (1) cooling the impermeable sheet by flowing cold aqueous feed past the sheet in a direction opposite to the hot feed flow direction, the cold feed absorbing the latent heat of condensation transmitted through the heat conductive sheet, (2) additionally heating the cold feed after it has cooled the sheet and absorbed the latent heat, said additional heating step raising the temperature of the cold feed up to the temperature of the hot feed, and (3) introducing the heated cold feed for flow past the membrane.

* * * * *

UNITED STATES PATENT AND TRADEMARK OFFICE
CERTIFICATE OF CORRECTION

PATENT NO. : 4,545,862

DATED : October 8, 1985

INVENTOR(S) : Wilbert L. Gore et al.

It is certified that error appears in the above-identified patent and that said Letters Patent is hereby corrected as shown below:

In Claim 4, Line 5, change "distillation" to

--distillate--.

Signed and Sealed this

Eleventh Day of February 1986

[SEAL]

Attest:

DONALD J. QUIGG

Attesting Officer

Commissioner of Patents and Trademarks